(12) United States Patent
Sasuga

(10) Patent No.: US 12,602,778 B2
(45) Date of Patent: Apr. 14, 2026

(54) INFORMATION PROCESSING APPARATUS, INFORMATION PROCESSING METHOD, AND INFORMATION PROCESSING PROGRAM

(71) Applicant: FUJIFILM Corporation, Tokyo (JP)

(72) Inventor: Saeko Sasuga, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 353 days.

(21) Appl. No.: 18/186,220

(22) Filed: Mar. 20, 2023

(65) Prior Publication Data

US 2023/0230245 A1 Jul. 20, 2023

Related U.S. Application Data

(63) Continuation of application No. PCT/JP2021/027589, filed on Jul. 26, 2021.

(30) Foreign Application Priority Data

Sep. 29, 2020 (JP) ................................. 2020-163871

(51) Int. Cl.
*G06T 7/00* (2017.01)
*G06V 10/25* (2022.01)
*G06V 10/75* (2022.01)

(52) U.S. Cl.
CPC ............ *G06T 7/0012* (2013.01); *G06V 10/25* (2022.01); *G06V 10/758* (2022.01); *G06T 2207/20081* (2013.01); *G06T 2207/30096* (2013.01)

(58) Field of Classification Search
CPC ......... G06T 7/0012; G06T 2207/20081; G06T 2207/30096; G06T 2207/10081;

(Continued)

(56) References Cited

U.S. PATENT DOCUMENTS

| | | | |
|---|---|---|---|
| 2014/0093129 A1 | 4/2014 | Okumura et al. | |
| 2020/0160552 A1 | 5/2020 | Hashimoto et al. | |

(Continued)

FOREIGN PATENT DOCUMENTS

| | | |
|---|---|---|
| JP | 2010160640 | 7/2010 |
| JP | 2014071832 | 4/2014 |

(Continued)

OTHER PUBLICATIONS

"Notice of Reasons for Refusal of Japan Counterpart Application", issued on Jan. 9, 2024, with English translation thereof, p. 1-p. 6.

(Continued)

*Primary Examiner* — Han Hoang
(74) *Attorney, Agent, or Firm* — JCIPRNET

(57) ABSTRACT

A plurality of training data in which range information indicating a range in which a first region and a second region including at least a part of the first region are present is added to each of a plurality of training images each including the first region and the second region are acquired. For each pixel of the training image, a probability that the pixel is a portion of the first region that is not included in the second region is calculated by using an estimation model. A probability sum, which is a sum of the probabilities, is calculated for each of the plurality of training images. The estimation model is trained such that the probability sum calculated for each of training images in which the first region has the portion that is not included in the second region is increased and the probability sum calculated for each of training images in which the first region does not have the portion that is not included in the second region is zero.

9 Claims, 8 Drawing Sheets

COMPLETE INCLUSION
RELATIONSHIP

(58) Field of Classification Search

CPC ........ G06T 7/11; G06V 10/25; G06V 10/758; G06V 10/778; G06V 10/82; G06V 2201/03; A61B 6/03

See application file for complete search history.

(56) References Cited

U.S. PATENT DOCUMENTS

| | | | | |
|---|---|---|---|---|
| 2021/0063323 | A1 | 3/2021 | Nakatani et al. | |
| 2021/0192180 | A1* | 6/2021 | Wang | G06V 20/698 |
| 2021/0241027 | A1* | 8/2021 | Hu | G06T 7/0012 |
| 2021/0365722 | A1* | 11/2021 | Masuda | G06F 18/285 |
| 2022/0222932 | A1* | 7/2022 | Zhang | G06N 3/08 |
| 2023/0107505 | A1* | 4/2023 | Bunel | G06N 3/084 |
| | | | | 382/128 |

FOREIGN PATENT DOCUMENTS

| | | |
|---|---|---|
| JP | 2017049891 | 3/2017 |
| JP | 2020086545 | 6/2020 |
| WO | 2019078154 | 4/2019 |
| WO | 2019159440 | 8/2019 |

OTHER PUBLICATIONS

Chandra Churh Chatterjee et al., "A Novel method for IDC Prediction in Breast Cancer Histopathology images using Deep Residual Neural Networks", 2nd International Conference on Intelligent Communication and Computational Techniques (ICCT), Sep. 28-29, 2019, pp. 95-100.

Han Le et al., "Utilizing Automated Breast Cancer Detection to Identify Spatial Distributions of Tumor Infiltrating Lymphocytes in Invasive Breast Cancer", Jan. 13, 2020, available at: https://arxiv.org/abs/1905.10841, pp. 1-13.

"International Search Report (Form PCT/ISA/210) of PCT/JP2021/027589", mailed on Sep. 14, 2021, with English translation thereof, pp. 1-7.

"Written Opinion of the International Searching Authority (Form PCT/ISA/237) of PCT/JP2021/027405", mailed on Sep. 14, 2021, with English translation thereof, pp. 1-6.

"Written Opinion of the International Searching Authority (Form PCT/ISA/237) of PCT/JP2021/027589", mailed on Sep. 14, 2021, with English translation thereof, pp. 1-6.

\* cited by examiner

COMPLETE INCLUSION
RELATIONSHIP

PARTIAL INCLUSION
RELATIONSHIP

START

ACQUIRE TARGET IMAGE — S11

CALCULATE PROBABILITIES $P_a$, $P_b$, AND $P_x$ FOR EACH PIXEL OF TARGET IMAGE — S12

SPECIFY CANCER REGION, MUSCULARIS PROPRIA REGION, AND CANCER REGION THAT IS NOT INCLUDED IN MUSCULARIS PROPRIA REGION — S13

DISPLAY EACH SPECIFIED REGION IN DISCRIMINABLE MANNER — S14

END

INFORMATION PROCESSING APPARATUS, INFORMATION PROCESSING METHOD, AND INFORMATION PROCESSING PROGRAM

CROSS-REFERENCE TO RELATED APPLICATION

This application is a continuation application of International Application No. PCT/JP2021/027589, filed Jul. 26, 2021, the disclosure of which is incorporated herein by reference in its entirety. Further, this application claims priority from Japanese Patent Application No. 2020-163871 filed on Sep. 29, 2020, the disclosures of which is incorporated herein by reference in its entirety.

BACKGROUND

1. Technical Field

The disclosed technology relates to an information processing apparatus, an information processing method, and an information processing program.

2. Description of the Related Art

The following technologies are known as technologies related to segmentation for recognizing what an object included in an image is in a pixel unit.

For example, JP2017-049891A discloses a method of specifying a region of a target object included in an image. The method includes the following processing. A candidate region of the target object is extracted from each of a plurality of images. A feature amount is extracted from each of the extracted candidate regions, and a degree of overlap between the candidate regions is calculated for each pair of the candidate regions extracted from the same image. A model for discriminating whether or not to represent the target object is estimated based on an object region set which is a subset extracted from a set of the candidate regions. The object region set is extracted from the set of the candidate regions such that an objective function including a function representing the degree of overlap between the candidate regions in the same image included in the object region set is optimized based on the feature amount extracted for each of the candidate regions, the degree of overlap calculated for each of the pair of the candidate regions, and the estimated model.

SUMMARY

Diagnostic imaging support is known as an example of utilization in a medical field of an image recognition technology using an estimation model trained by machine learning. For example, in rectal cancer, the cancer begins in a lumen of an intestinal tract and invades an outer tissue as the cancer progresses. Depending on whether or not the cancer has invaded peripheral tissues, the treatment policy or the region to be excised by surgery is changed. Therefore, in preoperative diagnosis, it is important to know an inclusion relationship between a cancer region and a peripheral tissue region. Specifying an inclusion relationship between the cancer region and the peripheral tissue region from the medical image, such as a magnetic resonance imaging (MRI) image and a computed tomography (CT) image, requires specialization and a heavy work load. Therefore, it is required to appropriately determine the presence or absence of cancer invasion into the peripheral tissues by using an estimation model, such as a neural network trained by machine learning, and to correctly visualize an invasion range in a case in which the invasion is observed.

Here, FIG. 1A is a diagram showing an example of a state in which an inclusion relationship between a region 101 and a region 102 is a complete inclusion relationship. In the present specification, the term "complete inclusion relationship" refers to a relationship in which all portions of one region are included in the other region. FIG. 1B is a diagram showing an example of a state in which the inclusion relationship between the region 101 and the region 102 is a partial inclusion relationship. In the present specification, the term "partial inclusion relationship" refers to a relationship in which only a portion of one region is included in the other region. That is, in a case in which the two regions have the partial inclusion relationship, one region has a portion that is not included in the other region.

FIG. 2A and FIG. 2B are tomographic images showing cases of rectal cancer, respectively. These tomographic images include a cancer region 201, a muscularis propria region 202, and a mesorectum region 203. FIG. 2A shows a case in which the cancer region 201 and the muscularis propria region 202 have the complete inclusion relationship, that is, a case of an early stage cancer in which the cancer region 201 has not invaded the mesorectum region 203. FIG. 2B shows a case in which the cancer region 201 and the muscularis propria region 202 have the partial inclusion relationship, that is, a case of advanced cancer in which the cancer region 201 has invaded the mesorectum region 203.

In order to appropriately determine the presence or absence of the invasion of the cancer region 201 into the mesorectum region 203 by using the estimation model, and to correctly visualize an invasion range in a case in which the invasion is observed, it is required for the estimation model to appropriately perform the segmentation on the cancer region 201 and the muscularis propria region 202 which are targets of the segmentation while appropriately specifying the inclusion relationship between these regions.

The disclosed technology has been made in view of the above points, and is to train the estimation model such that the estimation model appropriately performs the segmentation while appropriately specifying an inclusion relationship for a plurality of regions which are targets of the segmentation.

The disclosed technology relates to an information processing apparatus comprising at least one processor. The processor acquires a plurality of training data in which range information indicating a range in which a first region and a second region including at least a part of the first region are present is added to each of a plurality of training images each including the first region and the second region. The processor calculates, for each pixel of the training image, a probability that the pixel is a portion of the first region that is not included in the second region by using an estimation model, and calculates a probability sum, which is a sum of the probabilities, for each of the plurality of training images. The processor trains the estimation model such that the probability sum calculated for each of training images in which the first region has the portion that is not included in the second region is increased and the probability sum calculated for each of training images in which the first region does not have the portion that is not included in the second region is zero.

The processor may train the estimation model such that a loss is reduced, the loss including, as one of elements, an evaluation value in which a first average value, which is an average value of the probability sum calculated for each of the training images in which the first region has the portion that is not included in the second region, is included in a denominator and a second average value, which is an average value of the probability sum calculated for each of the training images in which the first region does not have the portion that is not included in the second region, is included in a numerator.

In a case in which the evaluation value is E1, the first average value is A1, the second average value is A2, and predetermined constants are $\alpha$ and $\beta$, Expression (I) may be satisfied.

$$E1=(A2+\alpha)/(A1+A2+\beta) \tag{I}$$

The estimation model may calculate, for each pixel of the training image, a probability $P_a$ that the pixel is the first region and a probability $P_b$ that the pixel is the second region to calculate $P_a \times (1-P_b)$ as the probability that the pixel is the portion of the first region that is not included in the second region.

The training image may be a medical image. The first region may be a lesion region and the second region may be a biological tissue region including at least a part of the lesion region.

The processor may acquire a target image including the first region and the second region, may specify at least one of the first region, the second region, or the portion of the first region that is not included in the second region by using the estimation model, and may perform control of displaying the specified region or portion in a discriminable manner.

Instead of the probability sum, the number of pixels in which the probability that the pixel is the portion of the first region that is not included in the second region is equal to or larger than a threshold value may be used.

The disclosed technology relates to an information processing method executed by at least one processor provided in an information processing apparatus, the method comprising acquiring a plurality of training data in which range information indicating a range in which a first region and a second region including at least a part of the first region are present is added to each of a plurality of training images each including the first region and the second region, calculating, for each pixel of the training image, a probability that the pixel is a portion of the first region that is not included in the second region by using an estimation model, calculating a probability sum, which is a sum of the probabilities, for each of the plurality of training images, and training the estimation model such that the probability sum calculated for each of training images in which the first region has the portion that is not included in the second region is increased and the probability sum calculated for each of training images in which the first region does not have the portion that is not included in the second region is zero.

The disclosed technology relates to an information processing program causing at least one processor provided in an information processing apparatus to execute a process comprising acquiring a plurality of training data in which range information indicating a range in which a first region and a second region including at least a part of the first region are present is added to each of a plurality of training images each including the first region and the second region, calculating, for each pixel of the training image, a probability that the pixel is a portion of the first region that is not included in the second region by using an estimation model, calculating a probability sum, which is a sum of the probabilities, for each of the plurality of training images, and training the estimation model such that the probability sum calculated for each of training images in which the first region has the portion that is not included in the second region is increased and the probability sum calculated for each of training images in which the first region does not have the portion that is not included in the second region is zero.

According to the disclosed technology, it is possible to train the estimation model such that the estimation model appropriately performs the segmentation while appropriately specifying the inclusion relationship for the plurality of regions which are the targets of the segmentation.

BRIEF DESCRIPTION OF THE DRAWINGS

Exemplary embodiments according to the technique of the present disclosure will be described in detail based on the following figures, wherein.

DETAILED DESCRIPTION

Figure 1A:
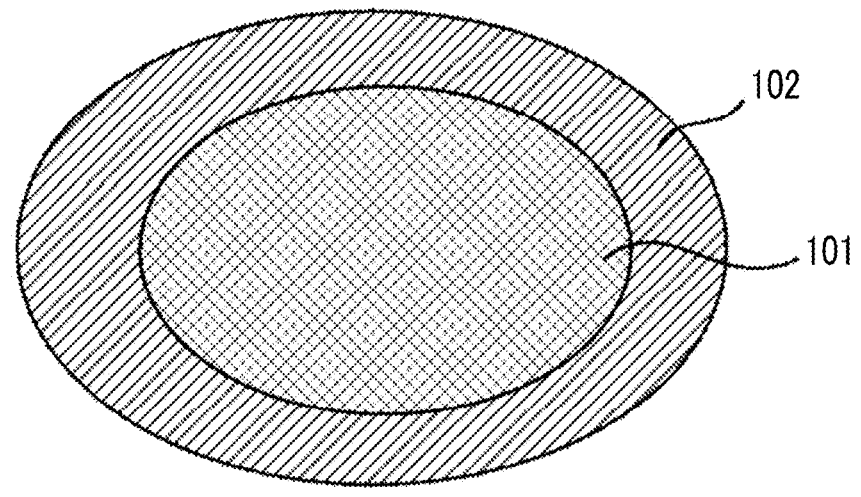
FIG. 1A is a diagram showing a case in which a plurality of regions have a complete inclusion relationship.
Figure 1B:
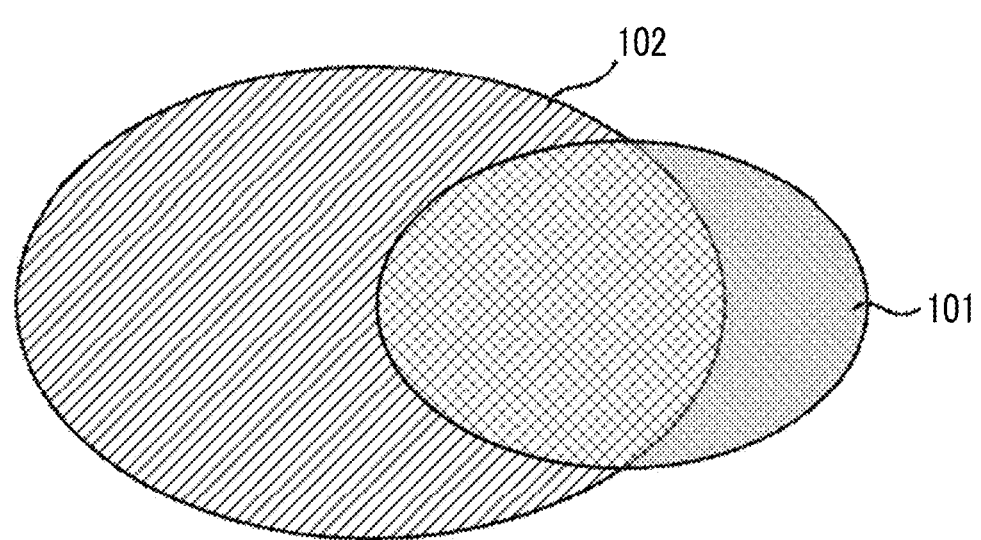
FIG. 1B is a diagram showing a case in which the plurality of regions have a partial inclusion relationship.
Figure 2A:
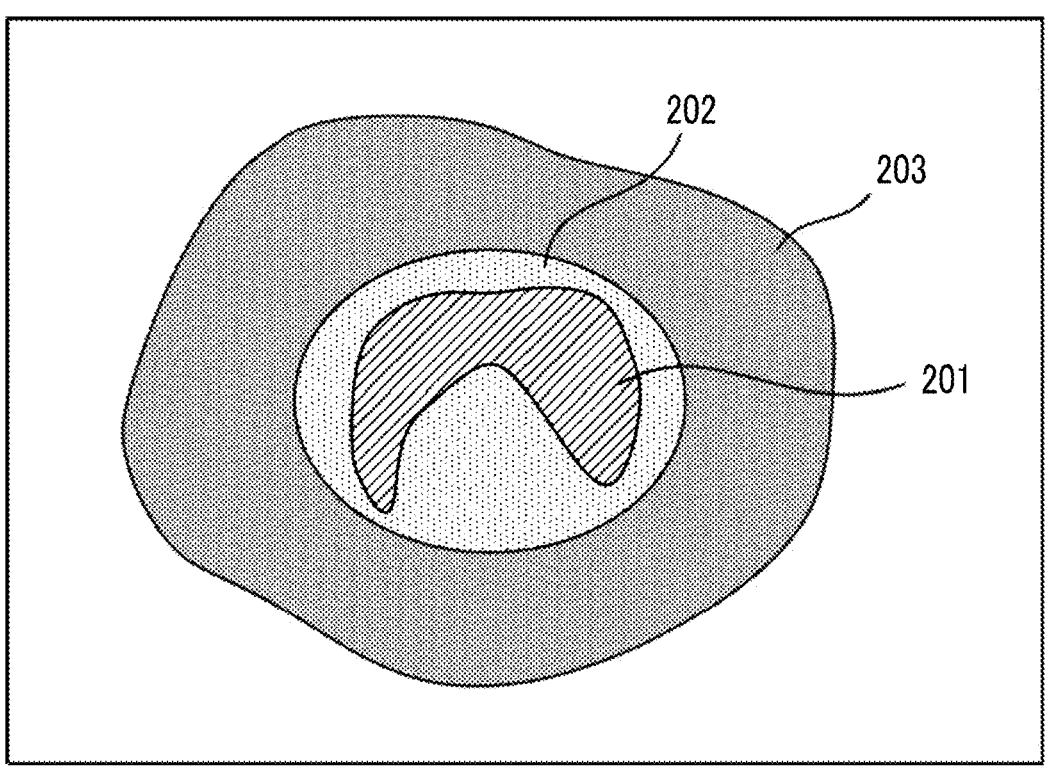
FIG. 2A is a tomographic image showing a case of rectal cancer.
Figure 2B:
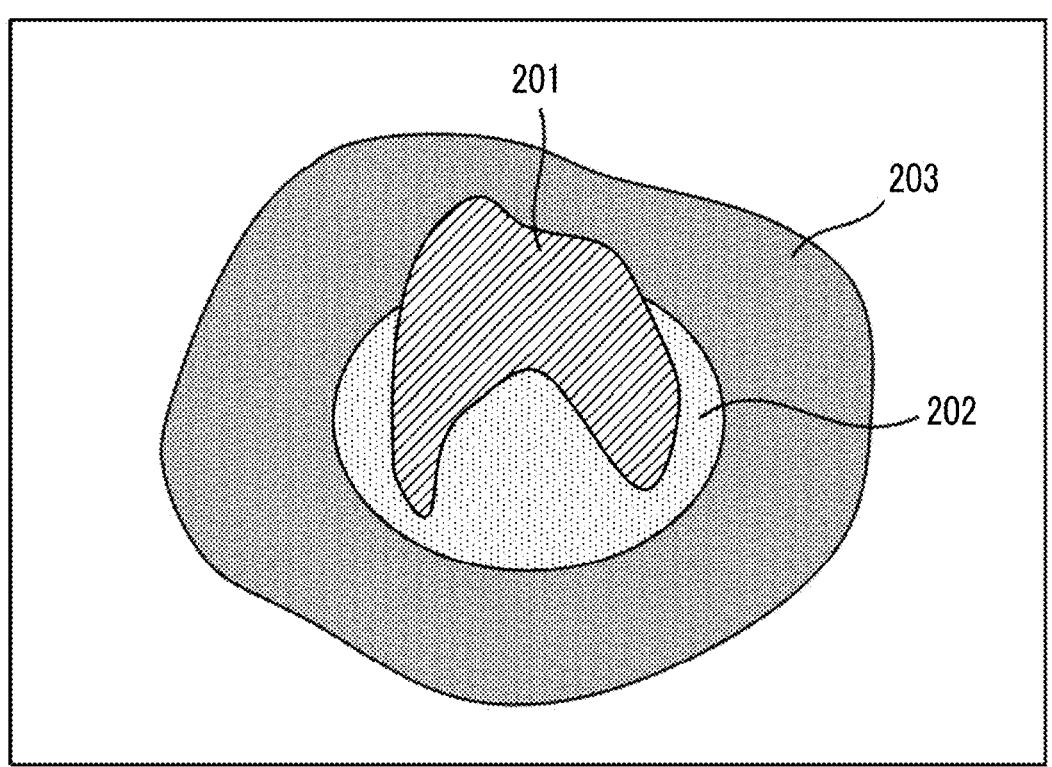
FIG. 2B is a tomographic image showing a case of the rectal cancer.

Hereinafter, an example of an embodiment of the disclosed technology will be described with reference to the drawings. It should be noted that the same or equivalent components and portions in the respective drawings are denoted by the same reference numerals, and the overlapping description will be omitted as appropriate.

Figure 3:
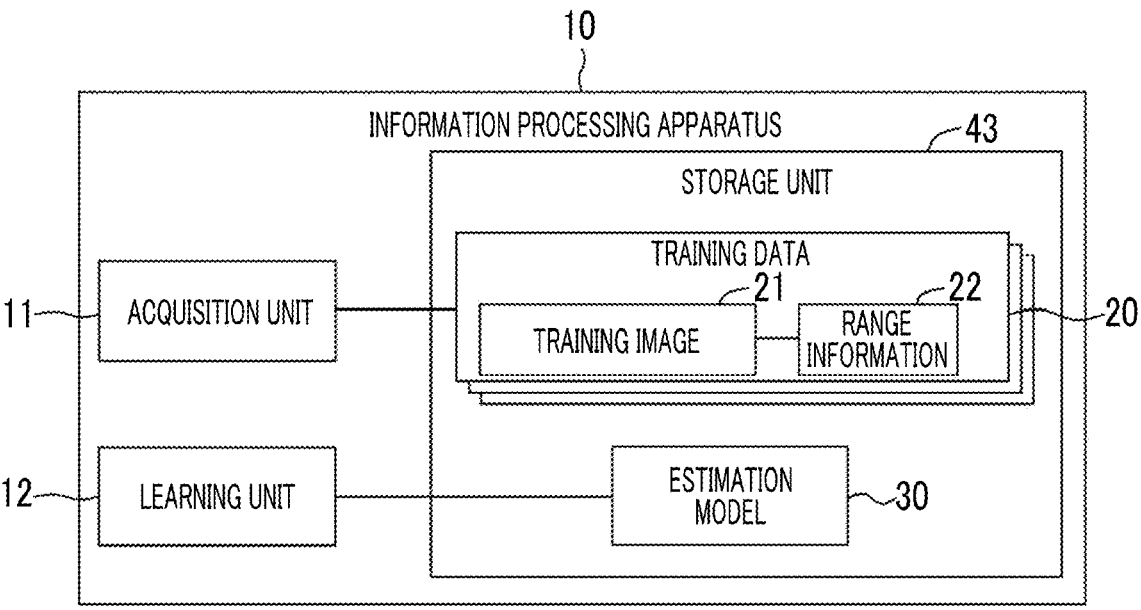
FIG. 3 is a diagram showing an example of a functional configuration of an information processing apparatus according to an embodiment of the disclosed technology in a learning phase.

FIG. 3 is a diagram showing an example of a functional configuration of an information processing apparatus 10 according to the embodiment of the disclosed technology in a learning phase. In the learning phase, the information processing apparatus 10 performs processing of training the estimation model 30 by machine learning. The information processing apparatus 10 trains the estimation model 30 such that the estimation model 30 appropriately performs the segmentation of a plurality of regions included in an image which is a processing target (hereinafter, referred to as a target image) while appropriately specifying the inclusion relationship between the plurality of regions. The information processing apparatus 10 comprises an acquisition unit 11, a learning unit 12, and a storage unit 43. A plurality of training data 20 and the estimation model 30 are stored in the storage unit 43.

Figure 4:
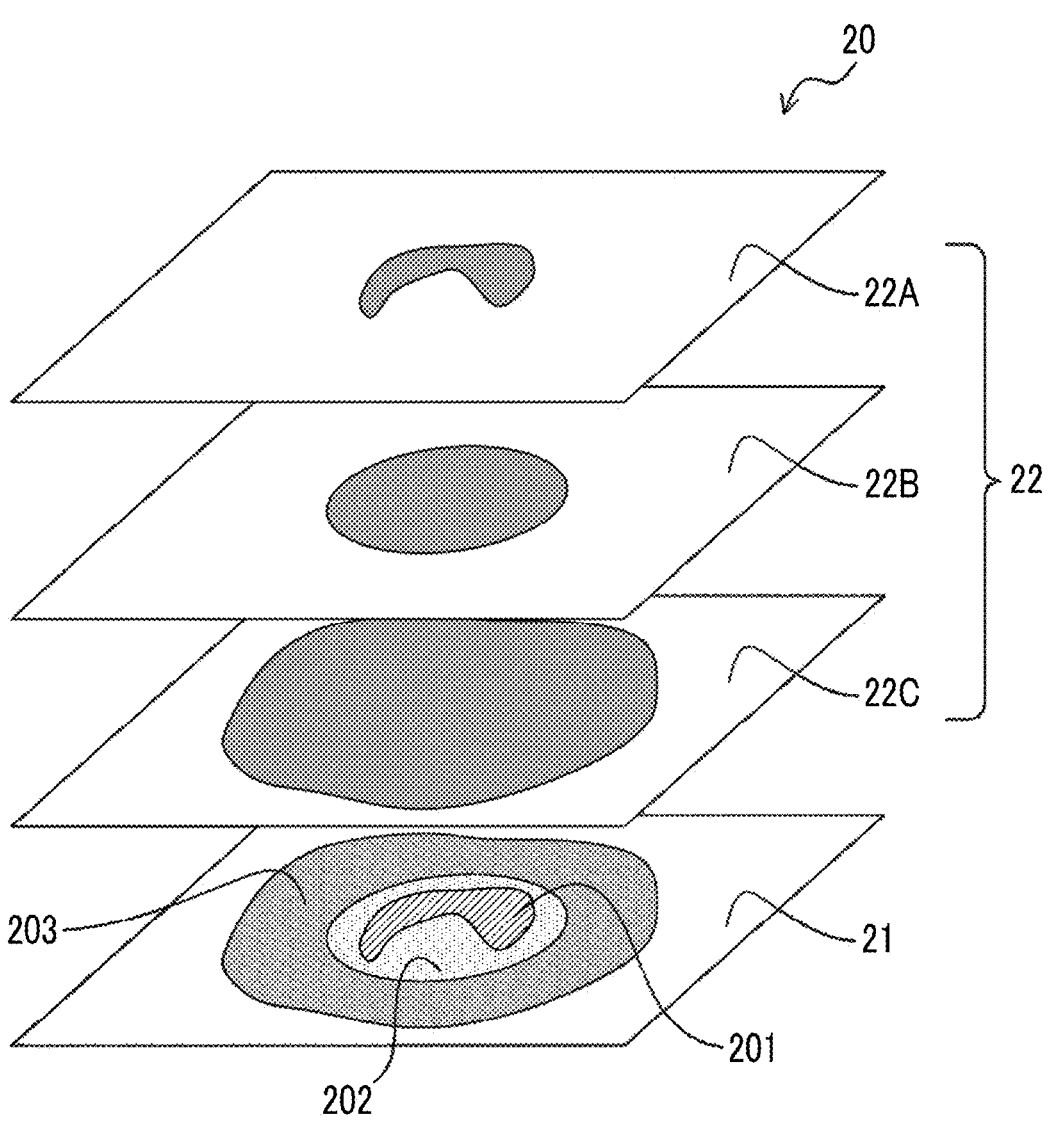
FIG. 4 is a diagram showing an example of training data according to the embodiment of the disclosed technology.

The acquisition unit 11 acquires the plurality of training data 20 stored in the storage unit 43. FIG. 4 is a diagram showing an example of the training data 20. The training data 20 is data in which range information 22 indicating a range in which each region is present is added as a correct answer mask to a training image 21 including a plurality of regions having a complete inclusion relationship or a partial inclusion relationship.

FIG. 4 shows a case in which a tomographic image showing a case of rectal cancer, which is a medical image, is used as the training image 21. The training image 21 includes a cancer region 201, a muscularis propria region 202, and a mesorectum region 203. The cancer region 201 and the muscularis propria region 202 have the complete inclusion relationship or the partial inclusion relationship. It should be noted that the cancer region 201 is an example of a first region according to the disclosed technology, and the muscularis propria region 202 is an example of a second region according to the disclosed technology.

The training data 20 is data in which range information 22A indicating a range in which the cancer region 201 is present, range information 22B indicating a range in which the muscularis propria region 202 is present, and range information 22C indicating a range in which the mesorectum region 203 is present are added as the correct answer masks to the training image 21. In a case in which the inclusion relationship between the cancer region 201 and the muscularis propria region 202 included in the training image 21 is the complete inclusion relationship, the entire range in which the cancer region is present indicated by the range information 22A is included in the range in which the muscularis propria region indicated by the range information 22B is present. On the other hand, in a case in which the inclusion relationship between the cancer region 201 and the muscularis propria region 202 included in the training image 21 is the partial inclusion relationship, a part of the range in which the cancer region is present indicated by the range information 22A is not included in the range in which the muscularis propria region indicated by the range information 22B is present. In addition, in the training image 21, both of these regions are assigned as correct answers to each pixel of a portion of the cancer region 201 that is included in the muscularis propria region 202.

The training data 20 includes both the training image 21 including a plurality of regions having the complete inclusion relationship and the training image 21 including a plurality of regions having the partial inclusion relationship.

The learning unit 12 trains the estimation model 30 using the training data 20 acquired by the acquisition unit 11. The estimation model 30 is a mathematical model constructed to perform the segmentation on a pixel (voxel or pixel) unit for the target image including the plurality of regions. The estimation model 30 performs the segmentation on the plurality of regions included in the target image while specifying the inclusion relationship. That is, the estimation model 30 assigns the plurality of regions to the pixels of a portion in which a certain region is included in the other region. The estimation model 30 may constitute a neural network, for example.

The learning unit 12 calculates, for each pixel of the training image 21, a probability $P_x$ that the pixel is a portion of the cancer region 201 that is not included in the muscularis propria region 202 by using the estimation model 30. The portion of the cancer region 201 that is not included in the muscularis propria region 202 is a cancer region that has invaded the mesorectum region 203 or a cancer region that has invaded further to the outside beyond the mesorectum region 203. The learning unit 12 calculates the probability $P_x$, for example, as follows.

The learning unit 12 inputs the training image 21 acquired by the acquisition unit 11 to the estimation model 30. The estimation model 30 performs the segmentation for each pixel on the input training image 21. Specifically, the estimation model 30 calculates, for each pixel of the training image 21, a probability $P_a$ that the pixel is the cancer region 201 and the probability $P_b$ that the pixel is the muscularis propria region 202. Further, the estimation model 30 calculates, for each pixel of the training image 21, $P_a \times (1-P_b)$ as a probability $P_x$ in which the pixel is the portion of the cancer region 201 that is not included in the muscularis propria region 202 (portion of the cancer region that has invaded the mesorectum region). That is, the probability $P_x$ is calculated as the probability that the pixel is the cancer region 201 and is not the muscularis propria region 202. The estimation model 30 calculates the probabilities $P_a$, $P_b$, and $P_x$ for each pixel of each of a plurality of training images 21.

The learning unit 12 calculates a probability sum $\Sigma P_x$, which is the sum of the probability $P_x$, for each of the plurality of training images 21. The probability sum $\Sigma P_x$ is a value corresponding to the volume (or area) of the portion of the cancer region 201 that is not included in the muscularis propria region 202 (portion of the cancer region that has invaded the mesorectum region) in the training image 21. In a case in which the estimation model 30 is ideal, the probability sum $\Sigma P_x$ calculated for the training image 21 in which the inclusion relationship between the cancer region 201 and the muscularis propria region 202 is the partial inclusion relationship should be a relatively large value, which is larger than zero. In addition, the probability sum $\Sigma P_x$ calculated for the training image 21 in which the inclusion relationship between the cancer region 201 and the muscularis propria region 202 is the complete inclusion relationship should be zero. Therefore, the learning unit 12 trains the estimation model 30 such that the probability sum $\Sigma P_x$ calculated for each training image 21 in which the inclusion relationship between the cancer region 201 and the muscularis propria region 202 is the partial inclusion relationship is a relatively large value, which is larger than zero and the probability sum $\Sigma P_x$ calculated for the training image 21 in which the inclusion relationship between the cancer region 201 and the muscularis propria region 202 is the complete inclusion relationship is zero.

Specifically, the learning unit 12 trains the estimation model 30 such that a loss L including, as one of the elements, an evaluation value E1 represented by Expression (1) is reduced. In Expression (1), A1 is an average value of the probability sum $\Sigma P_x$ calculated for each training image 21 in which the inclusion relationship between the cancer region 201 and the muscularis propria region 202 is the partial inclusion relationship, A2 is an average value of the probability sum $\Sigma P_x$ calculated for each training image 21 in which the inclusion relationship between the cancer region 201 and the muscularis propria region 202 is the complete inclusion relationship, and $\alpha$ and $\beta$ are constants. $\alpha$ and $\beta$ may be the same value. As the average value A1, a value, which is obtained by dividing a total value of the probability sum $\Sigma P_x$ calculated for each training image 21 in which the inclusion relationship between the cancer region 201 and the muscularis propria region 202 is the partial inclusion relationship by the number of these images, can be used. As the average value A2, a value, which is obtained by dividing a total value of the probability sum $\Sigma P_x$ calculated for each training image 21 in which the inclusion relationship between the cancer region 201 and the muscularis propria region 202 is the complete inclusion relationship by the number of these images, can be used. It should be noted that the average value A1 is an example of a first average value according to the disclosed technology, and the average value A2 is an example of a second average value according to the disclosed technology.

$$E1=(A2+\alpha)/(A1+A2+\beta) \qquad (1)$$

Expression (2) is an example of the loss L including the evaluation value E1 represented by Expression (1), as one of the elements. In Expression (2), an evaluation value E2 is another element of the loss L, W1 is a weight constant with respect to the evaluation value E1, and W2 is a weight constant with respect to the evaluation value E2. The evaluation value E1 mainly plays a role of improving the estimation accuracy of the inclusion relationship between the regions, and the evaluation value E2 mainly plays a role of improving the segmentation accuracy.

$$L=E1\times W1+E2\times W2 \qquad (2)$$

Expression (3) is an example of the evaluation value E2. As shown in Expression (3), soft dice loss can be used as the evaluation value E2. In Expression (3), $G_a$ is a correct answer value for each pixel based on the range information 22A, 1 is added to the pixel that is the cancer region 201, and 0 is added to the pixel that is not the cancer region 201. $P_a$ is a probability that the pixel is the cancer region 201, which is calculated by the estimation model 30. $G_b$ is a correct answer value for each pixel based on the range information 22B, 1 is added to the pixel that is the muscularis propria region 202, and 0 is added to the pixel that is not the muscularis propria region 202. $P_b$ is a probability that the pixel is the muscularis propria region 202, which is calculated by the estimation model 30. $G_c$ is a correct answer value for each pixel based on the range information 22C, 1 is added to the pixel that is the mesorectum region 203, and 0 is added to the pixel that is not the mesorectum region 203. $P_c$ is a probability that the pixel is the mesorectum region 203, which is calculated by the estimation model 30. $\gamma$, $\delta$, and $\varepsilon$ are weight constants for each class (cancer region 201, muscularis propria region 202, and mesorectum region 203), respectively. It should be noted that the evaluation value E2 is not limited to the soft dice loss represented by Expression (3), and other values that contribute to the improvement of the segmentation accuracy can also be used.

$$E2 = 1 - \frac{2}{\gamma+\delta+\varepsilon} \qquad (3)$$

$$\left( \frac{\sum(G_a*P_a)}{\sum G_a+\sum P_a}\times\gamma + \frac{\sum(G_b*P_b)}{\sum G_b+\sum P_b}\times\delta + \frac{\sum(G_c*P_c)}{\sum G_c+\sum P_c}\times\varepsilon \right)$$

Whether the inclusion relationship between the cancer region 201 and the muscularis propria region 202 included in the training image 21 is the complete inclusion relationship or the partial inclusion relationship can be grasped by the range information 22A and 22B as the correct answer mask added to the training image 21. In a case in which the estimation model 30 is ideal, the average value A1 should be a relatively large value, which is larger than zero, and the average value A2 should be zero. Therefore, by training the estimation model 30 such that the loss L is reduced, the loss L including, as one of elements, the evaluation value E1 in which the average value A1 is included in a denominator and the average value A2 is included in a numerator, the estimation model 30 that appropriately performs the segmentation of the cancer region 201 and the muscularis propria region 202 while appropriately specifying the inclusion relationship between these regions can be constructed.

Figure 5:
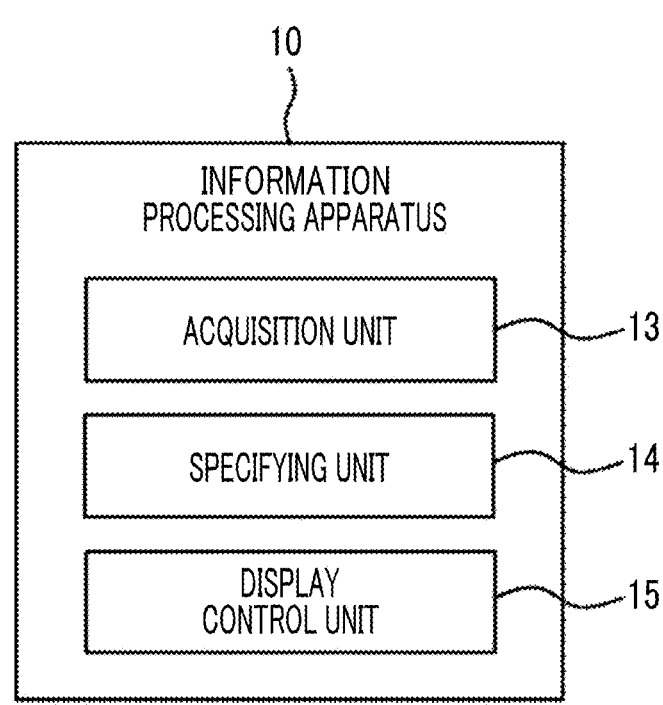
FIG. 5 is a diagram showing an example of a functional configuration of the information processing apparatus according to the embodiment of the disclosed technology in an operation phase.

FIG. 5 is a diagram showing an example of a functional configuration of the information processing apparatus 10 in an operation phase. In the operation phase, the information processing apparatus 10 operates the trained estimation model 30 to perform the segmentation for the plurality of regions included in the target image. The information processing apparatus 10 includes an acquisition unit 13, a specifying unit 14, and a display control unit 15.

The acquisition unit 13 acquires the target image including the plurality of regions that are the targets of the segmentation. Hereinafter, as an example, a case will be described in which the target image is the tomographic image similar to the training image 21 shown in FIG. 4, the cancer region, the muscularis propria region, and the mesorectum region are included in the target image, and the segmentation is performed for each of these regions.

The specifying unit 14 inputs the target image acquired by the acquisition unit 13 to the trained estimation model 30. The estimation model 30 performs the segmentation for each pixel of the target image. Specifically, the estimation model 30 calculates, for each pixel of the target image, the probability $P_a$ that the pixel is the cancer region and the probability $P_b$ that the pixel is the muscularis propria region. Further, the estimation model 30 calculates, for each pixel of the target image, $P_a\times(1-P_b)$ as the probability $P_x$ in which the pixel is the portion of the cancer region that is not included in the muscularis propria region (portion of the cancer region that has invaded the mesorectum region).

The specifying unit 14 specifies the region consisting of pixels in which the probability $P_a$ is equal to or larger than a predetermined threshold value as the cancer region, and specifies the region consisting of pixels in which the probability $P_b$ is equal to or larger than the predetermined threshold value as the muscularis propria region. In addition, the specifying unit 14 specifies a region consisting of pixels in which the probability $P_x(=P_a\times(1-P_b))$ is equal to or larger than the predetermined threshold value as the portion of the cancer region that is not included in the muscularis propria region (portion of the cancer region that has invaded the mesorectum region).

Figure 6:
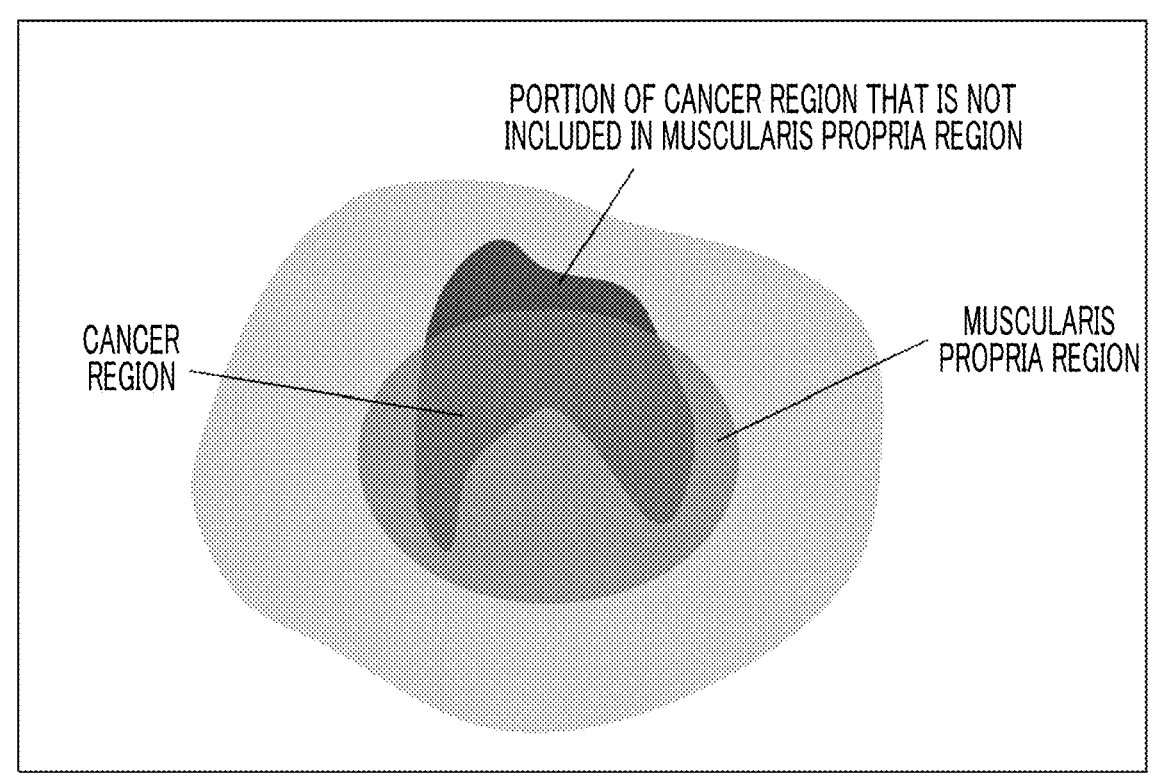
FIG. 6 is a diagram showing an example of display control in the information processing apparatus according to the embodiment of the disclosed technology.

The display control unit 15 performs control of displaying each region specified by the specifying unit 14 in a discriminable manner. For example, as shown in FIG. 6, the display control unit 15 performs control of displaying color-coded label images indicating ranges in which the cancer region, the muscularis propria region, and the portion of the cancer region that is not included in the muscularis propria region (portion of the cancer region that has invaded the mesorectum region) are present, respectively, in a manner of being superimposed on the target image. It should be noted that the specifying unit 14 may specify at least one of the cancer region, the muscularis propria region, or the portion that is not included in the muscularis propria region of the cancer region. In this case, the display control unit 15 performs control of displaying the region or portion specified by the specifying unit 14 in a discriminable manner.

Figure 7:
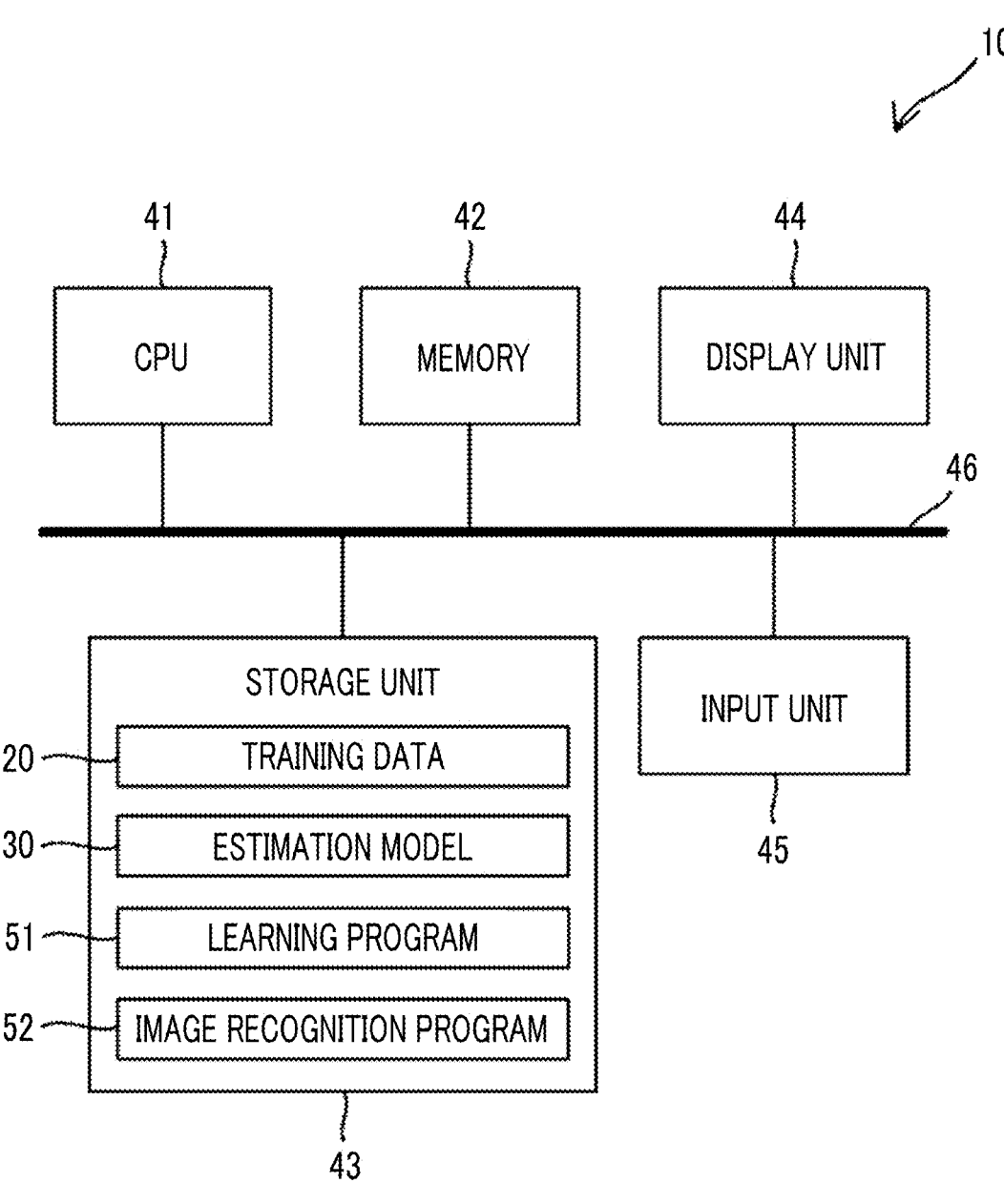
FIG. 7 is a diagram showing an example of a hardware configuration of the information processing apparatus according to the embodiment of the disclosed technology.

FIG. 7 is a diagram showing an example of a hardware configuration of the information processing apparatus 10. The information processing apparatus 10 comprises a central processing unit (CPU) 41, a memory 42 as a transitory storage area, and a non-volatile storage unit 43. In addition, the information processing apparatus 10 comprises a display unit 44 configured by a display device, such as a liquid crystal display, and an input unit 45 configured by an input device, such as a keyboard and a mouse. The CPU 41, the memory 42, the storage unit 43, the display unit 44, and the input unit 45 are connected to each other via a bus 46.

The storage unit 43 is realized by, for example, a non-volatile storage medium, such as a hard disk drive (HDD), a solid state drive (SSD), or a flash memory. The storage unit 43 stores the training data 20, the estimation model 30, a learning program 51, and an image recognition program 52. The CPU 41 loads the learning program 51 and the image recognition program 52 in the memory 42 and then executes the learning program 51 and the image recognition program 52. The CPU 41 executes the learning program 51, so that the CPU 41 functions as the acquisition unit 11 and the learning unit 12. In addition, the CPU 41 executes the image recognition program 52, so that the CPU 41 functions as the acquisition unit 13, the specifying unit 14, and the display control unit 15. The CPU 41 is an example of a processor according to the disclosed technology.

Figure 8:
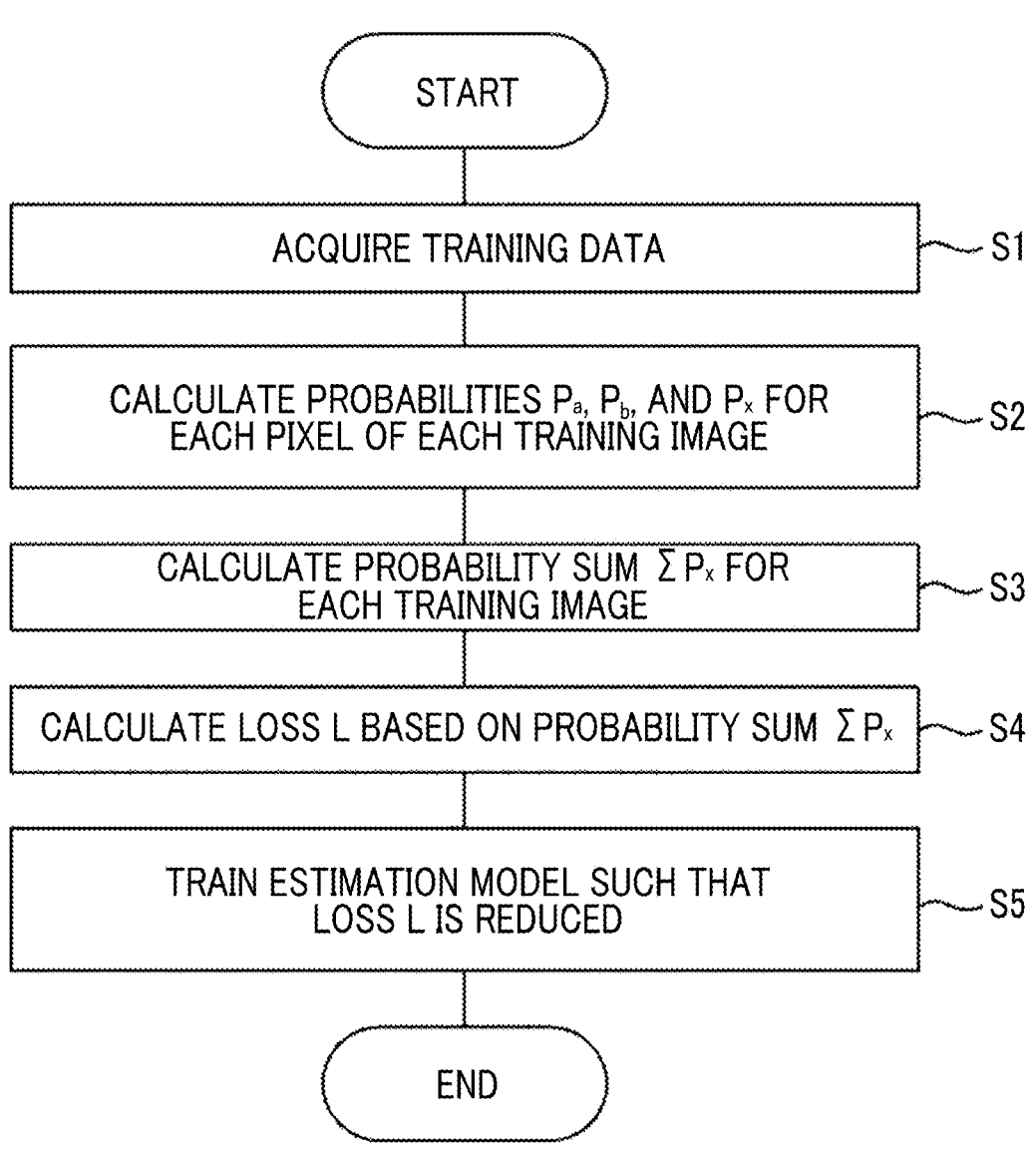
FIG. 8 is a flowchart showing an example of a flow of learning processing according to the embodiment of the disclosed technology.

FIG. 8 is a flowchart showing an example of a flow of learning processing executed by the CPU 41 executing the learning program 51. For example, the CPU 41 executes the learning program 51 in a case in which a user inputs an execution instruction of the learning processing via the input unit 45 in the learning phase.

In step S1, the acquisition unit 11 acquires the plurality of training data 20 stored in the storage unit 43.

In step S2, the learning unit 12 calculates, for each pixel of each of the plurality of training images 21, the probability $P_a$ that the pixel is the cancer region 201, the probability $P_b$ that the pixel is the muscularis propria region 202, and the probability $P_x(=P_a \times (1-P_b))$ that the pixel is the portion of the cancer region 201 that is not included in the muscularis propria region 202 (portion of the cancer region that has invaded the mesorectum region) by using the estimation model 30.

In step S3, the learning unit 12 calculates the probability sum $\Sigma P_x$ for each of the plurality of training images 21.

In step S4, the learning unit 12 calculates the loss L including, as one of the elements, the evaluation value E1 represented by Expression (1) based on the probability sum $\Sigma P_x$ calculated in step S3. As the loss L, for example, a value represented by Expression (2) can be used, and as the evaluation value E2, for example, a value represented by Expression (3) can be used.

In step S5, the learning unit 12 trains the estimation model 30 such that the loss L calculated in step S4 is minimized. The estimation model 30 is optimized by repeatedly executing the processing of steps S1 to S5 while exchanging the sets of the training data 20 to be used.

Figure 9:
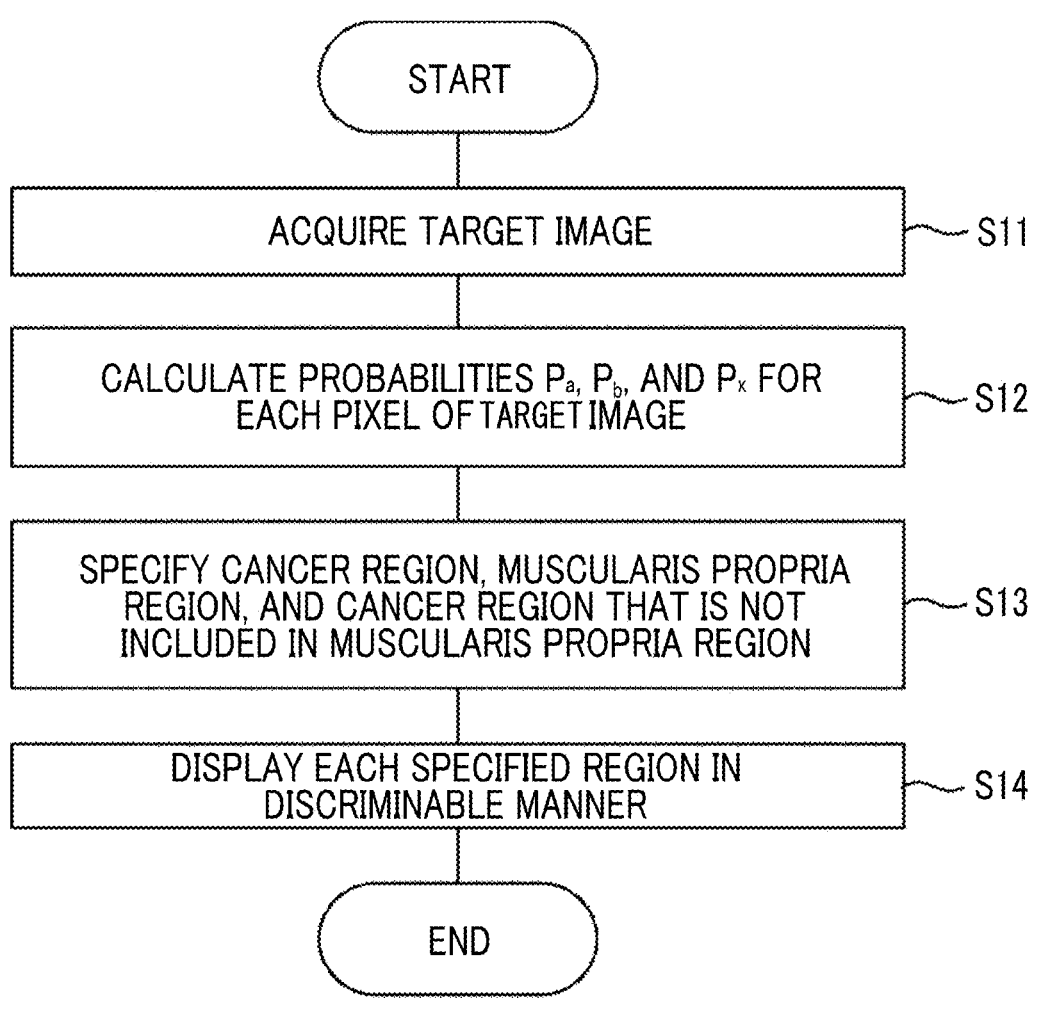
FIG. 9 is a flowchart showing an example of a flow of image recognition processing according to the embodiment of the disclosed technology.

FIG. 9 is a flowchart showing an example of a flow of image recognition processing executed by the CPU 41 executing the image recognition program 52. For example, the CPU 41 executes the image recognition program 52 in a case in which the user inputs an execution instruction of the image recognition processing via the input unit 45 in the operation phase.

In step S11, the acquisition unit 13 acquires the target image. In step S12, the specifying unit 14 calculates, for each pixel of the target image, the probability $P_a$ that the pixel is the cancer region, the probability $P_b$ that the pixel is the muscularis propria region, and the probability $P_x(=P_a \times (1-P_b))$ that the pixel is the portion of the cancer region that is not included in the muscularis propria region (the cancer region that has invaded the mesorectum region) by using the trained estimation model 30.

In step S13, the specifying unit 14 specifies the region consisting of pixels in which the probability $P_a$ is equal to or larger than the predetermined threshold value as the cancer region, and specifies the region consisting of pixels in which the probability $P_b$ is equal to or larger than the predetermined threshold value as the muscularis propria region. In addition, the specifying unit 14 specifies the region consisting of pixels in which the probability $P_x$ $(=P_a \times (1-P_b))$ is equal to or larger than the predetermined threshold value as the portion of the cancer region that is not included in the muscularis propria region (portion of the cancer region that has invaded the mesorectum region).

In step S14, the display control unit 15 performs control of displaying each region specified in step S13 in a discriminable manner. As shown in FIG. 6, the display control unit 15 performs, on the display unit 44, control of displaying the color-coded label images indicating ranges in which the cancer region, the muscularis propria region, and the portion of the cancer region that is not included in the muscularis propria region (portion of the cancer region that has invaded the mesorectum region) are present, respectively, in a manner of being superimposed on the target image.

As described above, the information processing apparatus 10 according to the embodiment of the disclosed technology acquires the plurality of training data 20 in which the range information 22A and 22B indicating the ranges in which the first region and the second region are present are added to each of the plurality of training images 21 each including the first region (for example, the cancer region) and the second region (for example, the muscularis propria region) that includes at least a part of the first region in the learning phase in which the estimation model 30 is trained. The information processing apparatus 10 calculates, for each pixel of the training image 21, the probability $P_x$ $(=P_a \times (1-P_b))$ that the pixel is the portion of the first region that is not included in the second region (for example, the portion of the cancer region that has invaded the mesorectum region) by using the estimation model 30. The information processing apparatus 10 calculates the probability sum $\Sigma P_x$, which is the sum of the probability $P_x$, for each of the plurality of training images 21. The information processing apparatus 10 trains the estimation model 30 such that the probability sum $\Sigma P_x$ calculated for each training image 21 in which the first region has the portion that is not included in the second region (that is, the inclusion relationship between the first region and the second region is the partial inclusion relationship) is increased and the probability sum $\Sigma P_x$ calculated for each training image 21 in which the first region does not have the portion that is not included in the second region (that is, the inclusion relationship between the first region and the second region is the complete inclusion relationship) is zero.

The information processing apparatus 10 trains the estimation model 30 as described above, so that the estimation model 30 can appropriately perform the segmentation while appropriately specifying the inclusion relationship for the plurality of regions included in the target image. In particular, by using the evaluation value E1 including the element of the probability $P_x$, it is possible to improve the specificity (probability of correctly determining a case not having the partial inclusion relationship as being not having the partial inclusion relationship).

In addition, in the operation phase in which the trained estimation model 30 is operated, the information processing apparatus 10 according to the embodiment of the disclosed technology acquires the target image including the first region and the second region, specifies at least one of the first region, the second region, or the portion of the first region that is not included in the second region by using the trained estimation model 30, and performs control of displaying the specified region or portion in a discriminable manner. As a result, it is possible to visualize, for example, the presence or absence of invasion of the cancer region into the peripheral tissues and the invasion range.

It should be noted that, in the above description, the case has been described in which the segmentation is performed on the cancer region and the muscularis propria region included in the medical image, but the disclosed technology can also be applied to a case in which the segmentation is performed on the lesion region other than the cancer region and the biological tissue region other than the muscularis propria region. In addition, the case has been described in which the target image is the medical image, but the disclosed technology is not limited to this. For example, the disclosed technology can also be applied to a case in which the segmentation is performed on a plurality of regions included in a microscopic image, an inspection image used in an inspection step of a production line, or the like.

In addition, a case has been described in which the evaluation value calculated based on the probability sum $\Sigma P_x$ is used as the evaluation value used for training the estimation model 30, but the disclosed technology is not limited to this aspect. It is also possible to use the number of pixels N in which the probability $P_x$ is equal to or larger than the threshold value, instead of the probability sum $\Sigma P_x$. Similar to the probability sum $\Sigma P_x$, the number of pixels N is the value corresponding to the volume (or area) of the portion of the cancer region 201 that is not included in the muscularis propria region 202 (portion of the cancer region that has invaded the mesorectum region). In a case in which the number of pixels N is used, the learning unit 12 trains the estimation model 30 such that the loss L including, as one of the elements, the evaluation value E1' represented by Expression (4) is reduced. In Expression (4), N1 is an average value of the number of pixels N calculated for each training image 21 in which the inclusion relationship between the cancer region 201 and the muscularis propria region 202 is the partial inclusion relationship, N2 is an average value of the number of pixels N calculated for each training image 21 in which the inclusion relationship between the cancer region 201 and the muscularis propria region 202 is the complete inclusion relationship, and α and β are constants. α and β may be the same value.

$$E1'=(N2+\alpha)/(N1+N2+\beta) \tag{4}$$

In the embodiment described above, various processors shown below can be used as the hardware structure of processing units that execute various types of processing, such as the acquisition unit 11, the learning unit 12, the acquisition unit 13, the specifying unit 14, and the display control unit 15. The various processors include, as described above, in addition to the CPU, which is a general-purpose processor which executes software (program) and functions as various processing units, a programmable logic device (PLD) which is a processor whose circuit configuration can be changed after manufacture, such as an FPGA, and a dedicated electric circuit which is a processor having a circuit configuration which is designed for exclusive use in order to execute specific processing, such as an application specific integrated circuit (ASIC).

One processing unit may be configured by one of the various processors or may be configured by a combination of two or more processors of the same type or different types (for example, a combination of a plurality of FPGAs or a combination of a CPU and an FPGA). In addition, a plurality of processing units may be configured by one processor.

A first example of the configuration in which the plurality of processing units are configured by one processor is a form in which one processor is configured by a combination of one or more CPUs and software and the processor functions as the plurality of processing units, as represented by the computer, such as a client and a server. Second, as represented by a system on chip (SoC) or the like, there is a form of using a processor that realizes the function of the entire system including the plurality of processing units by one integrated circuit (IC) chip. As described above, various processing units are configured by one or more of the various processors as the hardware structure.

Further, more specifically, an electric circuit (circuitry) obtained by combining circuit elements, such as semiconductor elements, can be used as the hardware structure of the various processors.

In addition, in the embodiment described above, an aspect has been described in which the learning program 51 and the image recognition program 52 are stored (installed) in the storage unit 43 in advance, but the disclosed technology is not limited to this. The learning program 51 and the image recognition program 52 may be provided in a form of being recorded in a recording medium, such as a compact disc read only memory (CD-ROM), a digital versatile disc read only memory (DVD-ROM), and a universal serial bus (USB) memory. In addition, a form may be adopted in which the learning program 51 and the image recognition program 52 are downloaded from an external device via the network.

It should be noted that the disclosure of JP2020-163871 filed on Sep. 29, 2020 is incorporated in the present specification in its entirety by reference. In addition, all documents, patent applications, and technical standards described in the present specification are incorporated herein by reference to the same extent as in a case in which each document, each patent application, and each technical standard are specifically and individually described by being incorporated in the present specification by reference.

What is claimed is:

1. An information processing apparatus comprising:

at least one processor, wherein the processor acquires a plurality of training data in which range information indicating a range in which a first region and a second region including at least a part of the first region are present is added to each of a plurality of training images each including the first region and the second region, wherein the training data includes both a training image including the first region and the second region having a complete inclusion relationship and a training image including the first region and the second region having a partial inclusion relationship, wherein in a case of the partial inclusion relationship, a part of the range in which the first region is present is not included in the range in which the second region is present and, the partial inclusion relationship is different from the complete inclusion relationship where an entire range in which the first region is present is included in the range in which the second region is present, calculates, for each pixel of the training image, a probability that the pixel is a portion of the first region that is not included in the second region by using an estimation model, calculates a probability sum, which is a sum of the probabilities, for each of the plurality of training images, and trains the estimation model such that for each of training images having the partial inclusion relationship in which the first region has the portion that is not included in the second region, the probability sum is increased and for each of training images having the complete inclusion relationship in which the first region does not have the portion that is not included in the second region, the probability sum is zero.

2. The information processing apparatus according to claim 1, wherein the processor trains the estimation model such that a loss is reduced, the loss including, as one of elements, an evaluation value in which a first average value, which is an average value of the probability sum calculated for each of the training images in which the first region has the portion that is not included in the second region, is included in a denominator and a second average value, which is an average value of the probability sum calculated for each of the training images in which the first region does not have the portion that is not included in the second region, is included in a numerator.

3. The information processing apparatus according to claim 2, wherein, in a case in which the evaluation value is E1, the first average value is A1, the second average value is A2, and predetermined constants are α and β, Expression (I) is satisfied $$E1=(A2+\alpha)/(A1+A2+\beta) \tag{I}.$$

4. The information processing apparatus according to claim 1, wherein the estimation model calculates, for each pixel of the training image, a probability $P_a$ that the pixel is the first region and a probability $P_b$ that the pixel is the second region to calculate $P_a \times (1-P_b)$ as the probability that the pixel is the portion of the first region that is not included in the second region.

5. The information processing apparatus according to claim 1, wherein the training image is a medical image, and the first region is a lesion region and the second region is a biological tissue region including at least a part of the lesion region.

6. The information processing apparatus according to claim 1, wherein the processor acquires a target image including the first region and the second region, specifies at least one of the first region, the second region, or the portion of the first region that is not included in the second region by using the estimation model, and performs control of displaying the specified region or portion in a discriminable manner.

7. The information processing apparatus according to claim 1, wherein, instead of the probability sum, the number of pixels in which the probability that the pixel is the portion of the first region that is not included in the second region is equal to or larger than a threshold value is used.

8. An information processing method executed by at least one processor provided in an information processing apparatus, the method comprising:

acquiring a plurality of training data in which range information indicating a range in which a first region and a second region including at least a part of the first region are present is added to each of a plurality of training images each including the first region and the second region, wherein the training data includes both a training image including the first region and the second region having a complete inclusion relationship and a training image including the first region and the second region having a partial inclusion relationship, wherein in a case of the partial inclusion relationship, a part of the range in which the first region is present is not included in the range in which the second region is present and, the partial inclusion relationship is different from the complete inclusion relationship where an entire range in which the first region is present is included in the range in which the second region is present;

calculating, for each pixel of the training image, a probability that the pixel is a portion of the first region that is not included in the second region by using an estimation model;

calculating a probability sum, which is a sum of the probabilities, for each of the plurality of training images; and training the estimation model such that for each of training images having the partial inclusion relationship in which the first region has the portion that is not included in the second region, the probability sum is increased and for each of training images having the complete inclusion relationship in which the first region does not have the portion that is not included in the second region, the probability sum is zero.

9. A non-transitory computer-readable storage medium storing an information processing program causing at least one processor provided in an information processing apparatus to execute a process comprising:

acquiring a plurality of training data in which range information indicating a range in which a first region and a second region including at least a part of the first region are present is added to each of a plurality of training images each including the first region and the second region, wherein the training data includes both a training image including the first region and the second region having a complete inclusion relationship and a training image including the first region and the second region having a partial inclusion relationship, wherein in a case of the partial inclusion relationship, a part of the range in which the first region is present is not included in the range in which the second region is present and, the partial inclusion relationship is different from the complete inclusion relationship where an entire range in which the first region is present is included in the range in which the second region is present;

calculating, for each pixel of the training image, a probability that the pixel is a portion of the first region that is not included in the second region by using an estimation model;

calculating a probability sum, which is a sum of the probabilities, for each of the plurality of training images; and training the estimation model such that for each of training images having the partial inclusion relationship in which the first region has the portion that is not included in the second region, the probability sum is increased and for each of training images having the complete inclusion relationship in which the first region does not have the portion that is not included in the second region, the probability sum is zero.

\* \* \* \* \*